United States Patent
Polyakov et al.

(10) Patent No.: US 8,667,583 B2
(45) Date of Patent: Mar. 4, 2014

(54) COLLECTING AND ANALYZING MALWARE DATA

(75) Inventors: Alexey Polyakov, Sammamish, WA (US); Marc Seinfeld, Fort Lauderdale, FL (US); Jigar J. Mody, Bellevue, WA (US); Ning Sun, Houston, TX (US); Tony Lee, Sammamish, WA (US); Chengyun Chu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 370 days.

(21) Appl. No.: 12/234,717

(22) Filed: Sep. 22, 2008

(65) Prior Publication Data

US 2010/0077481 A1    Mar. 25, 2010

(51) Int. Cl.
| G06F 11/00 | (2006.01) |
| G06F 12/14 | (2006.01) |
| G06F 12/16 | (2006.01) |
| G08B 23/00 | (2006.01) |

(52) U.S. Cl.
USPC .......................................................... 726/22

(58) Field of Classification Search
USPC ............ 713/188; 726/1, 3–15, 22–25, 27–30, 726/17, 21
See application file for complete search history.

(56) References Cited

U.S. PATENT DOCUMENTS

| 6,035,423 | A | 3/2000 | Hodges et al. |
| 6,205,551 | B1 * | 3/2001 | Grosse ............................. 726/25 |
| 6,611,925 | B1 * | 8/2003 | Spear ......................... 714/38.14 |
| 6,742,128 | B1 * | 5/2004 | Joiner ............................. 726/25 |
| 7,171,690 | B2 | 1/2007 | Kouznetsov et al. |
| 7,210,168 | B2 | 4/2007 | Hursey et al. |
| 7,356,736 | B2 * | 4/2008 | Natvig ....................... 714/38.12 |

(Continued)

FOREIGN PATENT DOCUMENTS

| WO | 2008048665 A2 | 4/2008 |
| WO | 2008067335 A2 | 6/2008 |

OTHER PUBLICATIONS

Ulrich Bayer, "TTAnalyze: A Tool for Analyzing Malware", retrieved at <<http://www.seclab.tuwien.ac.at/people/ulli/TTAnalyze_A_Tool_for_Analyzing_Malware.pdf>>, Vienna, Dec. 12, 2005, pp. 100.

(Continued)

*Primary Examiner* — Dant Shaifer Harriman
(74) *Attorney, Agent, or Firm* — Ben Tabor; Kate Drakos; Micky Minhas

(57) ABSTRACT

A malware analysis system is described that provides information about malware execution history on a client computer and allows automated back-end analysis for faster creation of identification signatures and removal instructions. The malware analysis system collects threat information on client computers and sends the threat information to a back-end analysis component for automated analysis. The back-end analysis component analyzes the threat information by comparing the threat information to information about known threats. The system builds a signature for identifying the threat family and a mitigation script for neutralizing the threat. The system sends the signature and mitigation data to client computers, which use the information to mitigate the threat. Thus, the malware analysis system detects and mitigates threats more quickly than previous systems by reducing the burden on technicians to manually create environments for reproducing the threats and manually analyze the threat behavior.

20 Claims, 4 Drawing Sheets

(56) References Cited

U.S. PATENT DOCUMENTS

| | | | |
|---|---|---|---|
| 7,392,543 | B2 | 6/2008 | Szor |
| 7,543,146 | B1* | 6/2009 | Karandikar et al. ......... 713/175 |
| 2005/0188272 | A1 | 8/2005 | Bodorin et al. |
| 2005/0289649 | A1 | 12/2005 | Mitomo et al. |
| 2006/0070130 | A1 | 3/2006 | Costea et al. |
| 2006/0236392 | A1 | 10/2006 | Thomas et al. |
| 2007/0038677 | A1 | 2/2007 | Reasor et al. |
| 2008/0086776 | A1* | 4/2008 | Tuvell et al. .................... 726/24 |
| 2008/0141371 | A1 | 6/2008 | Bradicich et al. |
| 2008/0141373 | A1 | 6/2008 | Fossen et al. |
| 2009/0287658 | A1* | 11/2009 | Bennett ............................ 707/3 |

OTHER PUBLICATIONS

Nick Del Grosso, "It's Time to Rethink your Corporate Malware Strategy", retrieved at <<http://www.sans.org/rr/papers/36/124.pdf>>, Feb. 24, 2002, pp. 12.

Kirda, et al., "Behavior-Based Spyware Detection", Proceedings of the 15th USENIX Security Symposium, 2006, pp. 22.

Office Action from the Chinese Patent Office in corresponding application No. 200980138004.3, Dated Sep. 28, 2012, 14 pages.

Office Action from the Chinese Patent Office in corresponding application No. 200980138004.3, Dated Apr. 15, 2013, 14 pages.

Office Action from the Chinese Patent Office in corresponding application No. 200980138004.3, Dated Jul. 15, 2013, 12 pages.

* cited by examiner

COLLECTING AND ANALYZING MALWARE DATA

BACKGROUND

Antivirus, antispyware, and other anti-malware applications seek to protect client computers by identifying harmful applications or other executable code and removing or at least neutralizing the harmful code. Current anti-malware applications (e.g., Microsoft Windows Defender, Microsoft Forefront Client Security, Microsoft OneCare, Microsoft Forefront Server for Exchange Server, and so forth) use a signature-based approach to detect viruses, worms, and spyware. The signature-based approach relies on one or more distinguishing features of the malware to provide a positive identification so that the anti-malware application can remove it. For example, a particular malware application may have a certain file name, write a certain value to the operating system configuration database (e.g., the Microsoft Windows Registry), or contain executable code having certain bytes (e.g., identified using a CRC, cryptographic hash, or other signature algorithm).

The signature-based approach is heavily dependent on analysis of existing malware by skilled technicians and the quality of that analysis. Typically, a technician receives a sample of a new threat or a variant of an already known threat. For example, a user may email the threat in the form of one or more files to an email address for reporting malware. The technician then begins investigation. During the investigation, the technician may execute malware in a virtual environment, such as a sandboxed computer system that cannot cause harm to other computer systems even if the malware affects the computer system. If the malware sample successfully runs in the virtual environment and produces enough information, the technician analyzes the execution history, content of created/deleted files, registry keys, network activity, and other activity of the malware and creates detection signatures and removal instructions. For example, if the malware creates a file virus.exe in a particular directory, the signature may identify the file and the removal script may specify deleting the file at its typical location.

This type of analysis is problematic for several reasons. First, the process involves human analysis and thus is slow and bottlenecked by the available technicians to review new threats. The rate of new threats increases all the time, and there are often fewer available technicians than there are malware authors creating new malware. Second, the technician may not be able to successfully run the malware in the virtual environment, and thus may not be able to understand a complete model of how the malware behaves. This can lead to failure to detect the malware in some variants or incomplete removal of the malware, for example. Examples of reasons the malware might not run in the virtual environment are the malware detecting the domain of the technician as being an anti-malware vendor domain, the malware failing to run if the operating system version or an installed application is not the one expected by the malware author, and so forth. Sometimes the sample received from the customer computer might contain insufficient information about the threat. For example, the report may only include a driver and a few other files without enough information for the technician to understand how to run the malware. This case usually ends with incomplete detection/removal that affects the customer experience.

Often, client computers are infected when a user visits a website and allows installation of "unknown software" (typically, users believe they are installing good software). The original URL that users visited often does not contain the binaries, but rather redirects to another "short-life cycle" uniform resource locator (URL). Once a technician receives the original URL and begins investigation, the "short-life cycle" URL may no longer contain the malware. Technicians may never receive enough information to catch the actual culprit or detect the malware in its earliest form. Further, some samples may evade analysis for a while because technicians or early threat analysis prioritizes them low. For example, the threat may have received a limited numbers of reports, which may only be because the anti-malware does not inherently detect the threat yet (i.e., a false negative).

Another problem is misidentification of a new variant of previously identified malware in which the removal script produced by the technician does not clean the new variant. This can come from slowness to update the anti-malware application with the latest information about recent changes in malware families. The technician may also not receive a complete picture of the malware been analyzed because the malware expects a special environment or combination of user actions that are not obvious or present in the technician's environment. For example, before the malware executes it may expect the user to visit a particular web site. After the user visits the website, the malware may replace the user's security certificate with one belonging to the malware that redirects the user's web browser traffic through a spyware web site and monitors the user's browsing habits. If the technician never visits the website, then the malware will not produce enough information for the technician to understand the offending behavior of the malware.

SUMMARY

A malware analysis system is described that provides information about malware execution history on a client computer and allows automated back-end analysis for faster creation of identification signatures and removal instructions. The malware analysis system collects threat information on client computers and sends the threat information to a back-end analysis component for automated analysis. The back-end analysis component analyzes the threat information by comparing the threat information to information about known threats. The system builds a signature for identifying the threat family and a mitigation script for neutralizing the threat. The system sends the signature and mitigation data to client computers, which use the information to mitigate the threat. Thus, the malware analysis system detects and mitigates threats more quickly than previous systems by reducing the burden on technicians to manually create environments for reproducing the threats and manually analyze the threat behavior.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A malware analysis system is described that provides information about malware execution history on a client computer and allows automated back-end analysis for faster creation of identification signatures and removal instructions. The malware analysis system collects threat information on client computers and sends the threat information to a back-end analysis component for automated analysis. For example, the system may collect URLs visited, user actions performed, files accessed, and other information about a potential threat posed by malware. The system may trigger the collection of threat information when specific events occur, such as when an application attempts to visit a website. The back-end analysis component analyzes the threat information by comparing the threat information to information about known threats. For example, the back-end analysis component may identify similar previous threats based on the threat information and categorize the new threat into a threat family. The system builds a signature for identifying the threat family and a mitigation script for neutralizing the threat. For example, the signature may identify files that are common to the threat family and the mitigation script may delete files installed by the malware. The system sends the signature and mitigation data to client computers, which mitigate the threat. Thus, the malware analysis system detects and mitigates threats more quickly than previous systems by reducing the burden on technicians to manually create environments for reproducing the threats and manually analyze the threat behavior. An anti-malware vendor can then target limited technician resources at the most relevant and difficult to mitigate threats.

Figure 1:
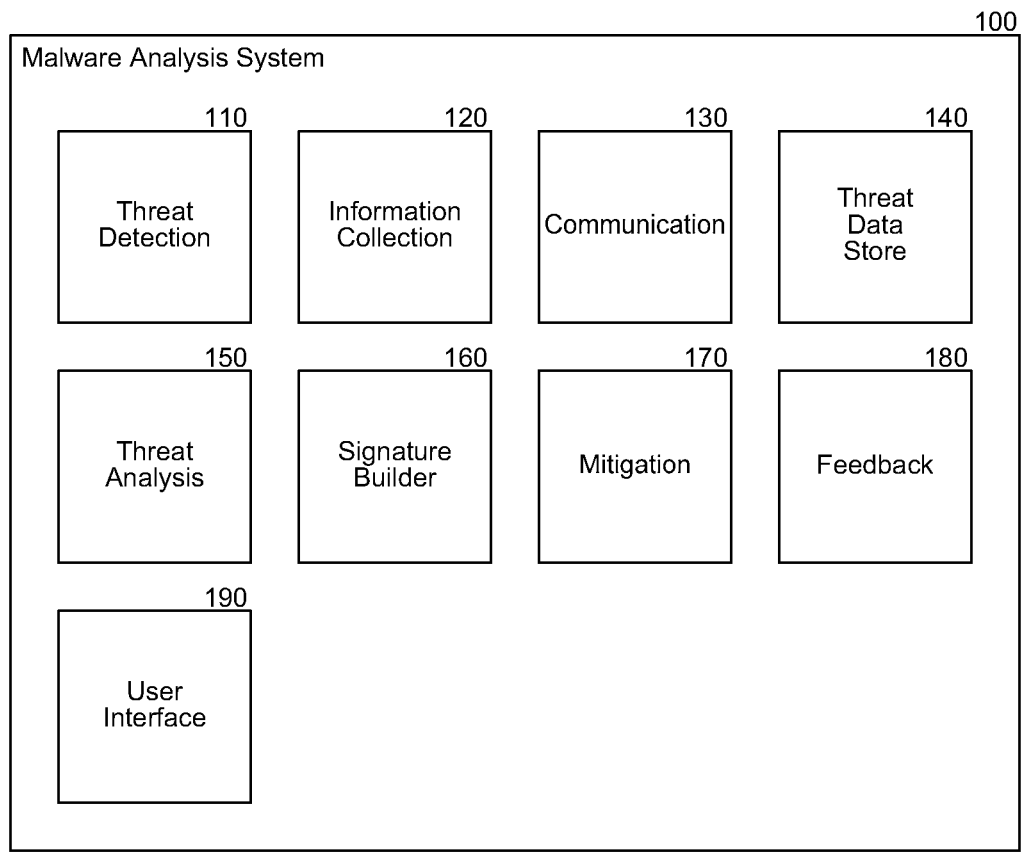
FIG. 1 is a block diagram that illustrates components of the malware analysis system, in one embodiment.

FIG. 1 is a block diagram that illustrates components of the malware analysis system, in one embodiment. The malware analysis system 100 includes a threat detection component 110, an information collection component 120, a communication component 130, a threat data store 140, a threat analysis component 150, a signature builder component 160, a mitigation component 170, a feedback component 180, and a user interface component 190. The components may be divided between one or more client computers and a back-end service running on one or more servers. Each of these components is described in further detail herein.

The threat detection component 110 detects events on a client computer that indicate a potential threat and signals the information collection component 120 to track information about the threat. The events may be pre-defined by the system or dynamically updated as client computers receive new threat signatures from the back-end service. The threat detection component 110 may include a kernel mode driver that executes at a low-level of an operating system to detect various types of threats.

The information collection component 120 collects information about potential threats at a client computer. For example, the information collection component 120 may store information about files, directories, registry keys, URLs, and other resources accessed by an application. The component 120 may also store historical and hierarchical data that indicates how a potentially malicious piece of code initiated each action. For example, if a user visited a website, downloaded a malicious application, and the application contacted another website, the data may indicate the order of these events and the relationships between them.

The communication component 130 communicates information between client computers and the back-end service. For example, the client computers send threat information to the back-end service using the communication component 130. The back-end service sends updated signatures and mitigation instructions to the client computers through the communication component 130. The communication component 130 may operate over the Internet, a local area network (LAN), or other communication medium.

The threat data store 140 stores information about encountered threats reported by client computers, a queue of threats waiting to be analyzed, families of known threats and their characteristics, signatures for detecting threats, and mitigation instructions for removing detected threats. The threat data store 140 serves as a repository for threat information and the system can mine the threat data store 140 to identify commonalities among threats, statistics such as the rate of occurrence of a particular threat, and so forth.

The threat analysis component 150 configures an execution environment for received threat reports, executes threats, and attempts to classify threats based on previously encountered families of threats. For example, the threat analysis component 150 may inspect a threat report to determine the operating system and configuration of the client computer that submitted the report, configure a similar computer in a virtual or sandboxed environment, and carry out user and other actions indicated in the threat report to observe the behavior of the malware associated with the threat.

The signature builder component 160 inspects the execution environment configured by the threat analysis component 150 to determine identifying characteristics of the threat. For example, the threat may download a particular file, access a particular URL, or store information in a particular registry key that indicates a behavior that distinguishes the threat from other safe operations. The signature builder component 160 creates a signature for detecting instances of the threat based on the distinguishing behavior.

The mitigation component 170 applies signatures and mitigation instructions to identify known threats and carry out actions in response to identified threat instances. For example, the mitigation component 170 may receive a signature update from the back-end service and scan the client computer for each signature received from the service to determine if any threat instances are present on the client computer. If a threat instance is present on the client computer, then the mitigation component 170 carries out actions associated with the signature and received from the back-end service. For example, the actions may specify files to delete, additional information to gather and send to the back-end service, and so forth. The mitigation component 170 removes threatening malware from the client computer and gathers additional information for threats for which the back-end service has insufficient information to eliminate (as described further herein).

The feedback component 180 analyzes threat detection rates and prioritizes threat reports based on certain criteria. For example, the feedback component 180 may prioritize threats that match a particular known threat family higher than other threats. The component 180 also watches new signature updates that the back-end service deploys to client computers to determine if detection rates for a threat increase. An increasing detection rate may indicate a previous false positive and lead the system to increase the priority of a previously lower priority threat. The feedback component 180 improves threat detection on an on-going basis by focusing threat analysis resources on the most troublesome threats.

The user interface component 190 provides an interface for technicians and system administrators to guide and tune the system. For example, a technician may identify families of threats, request additional information from client computers that report a particular threat, and so on. The user interface 190 provides the technician with a way to view threat information and analyze threat information to handle threats that the system 100 cannot mitigate without technician intervention.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
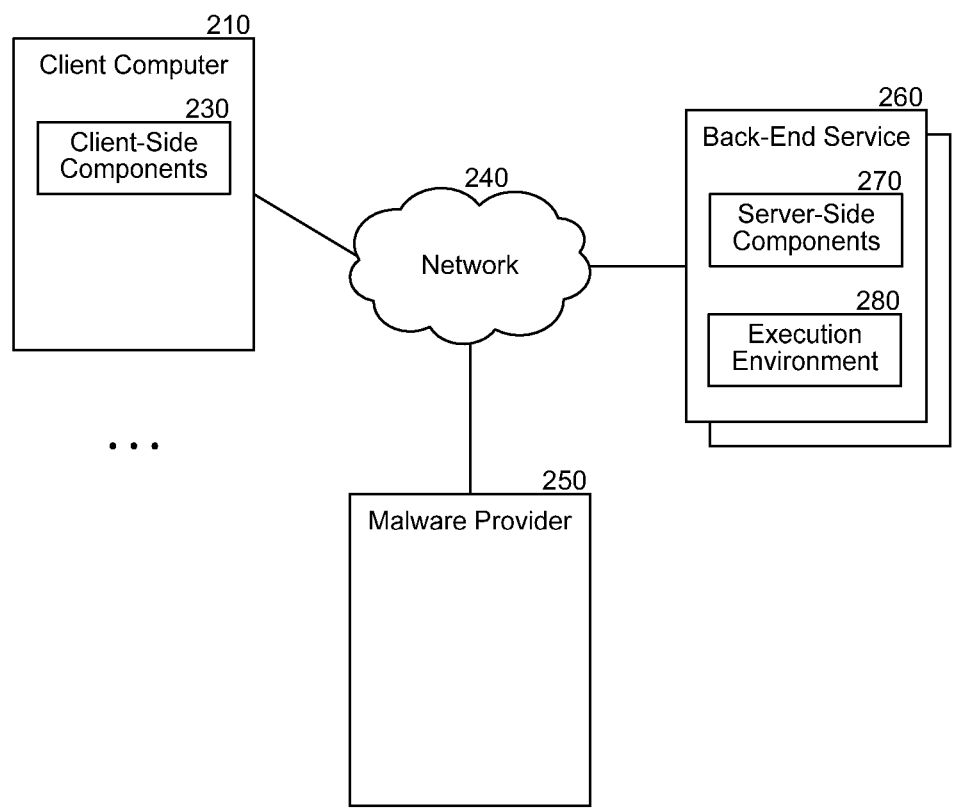
FIG. 2 is a block diagram that illustrates a typical operating environment of the malware analysis system, in one embodiment.

FIG. 2 is a block diagram that illustrates a typical operating environment of the malware analysis system, in one embodiment. One or more client computers 210 are connected by a network 240 to a back-end service 260. Each client computer 210 includes client-side components 230 of the malware analysis system that detect and analyze information about threats on the client computer 210. The client-side components 230 provide detailed information about the execution history of potential threats to the back-end service 260 for further analysis. The back-end service 260 includes server-side components 270 of the malware analysis system. The client-side components 230 and server-side components 270 may include, for example, one or more components described in FIG. 1. Those of ordinary skill in the art will recognize that many configurations of operating components on the client and server are possible to provide the benefits described herein based on requirements such as scalability, reliability, and security. Thus, the components may operate on the client computer 210 or back-end service 260 based on these and other considerations.

The back-end service may include an execution environment 280 for reproducing the execution and behavior of detected threats. The client computer 210 and execution environment 280 may both connect to a malware provider 250 during execution of malware. For example, the malware may cause the client computer 210 to connect and provide data to the malware provider 250. The back-end service 260 observes the malware execution in the execution environment 280 and provides signatures and mitigation information as described further herein.

Client Data Collection

The malware analysis system improves the threat information available to technicians and automated remediation tools by starting the collection of information earlier in the threat lifetime, keeping additional information about threats than what was previously available, and providing a more complete threat model to the back-end.

Previously, users submitted an infected sample for analysis that typically contained a single file and limited metadata that might be insufficient for successful back-end analysis. To improve the quality and success ratio of back-end threat analysis, the malware analysis system collects more metadata from the infected computer. This data, for example, may describe the malware execution history, user actions related to malware execution, browsing history, malware bundle installation traces, and other details.

In some embodiment, the malware analysis system performs initial threat analysis on the client side, rather than creating various environment configurations (e.g., multiple operating systems) on the back-end and providing expensive manual analysis. For example, the malware analysis system may install a kernel-mode configurable component on the client computer that does the following. First, the component is configurable and can be enabled and disabled by configuration. When the component is disabled, it remains in the memory but uses only a small amount of client resources. It may only perform a periodic self-audit to prevent code injection that compromises the component.

Second, the component monitors registry key creation, modification, deletion, and other modifications. When the component detects these modifications, it identifies a process that is responsible for the change and stores this information in a threat log. The component may perform similar monitoring and logging for files, directories, and other client elements. Third, the component monitors changes in kernel memory (e.g., Service Description Table, EPROCESS structure) and detects changes after a file been executed that modify the file. If the component detects changes, it correlates the event with the process that is responsible for the event and adds this information to the threat log. Fourth, the component monitors the creation of TCP/UDP connections and logs related information. The component may also analyze utilization frequency for opened ports and correlate utilization activity with a process.

In some embodiments, the malware analysis system intercepts and logs user-driven events. For example, the system may track the user's browsing history, such as the web addresses the user visited in a web browser. The system may store URLs in a normalized for that removes sensitive user information to protect the user's privacy. The system may also track software installed by the user. For example, if the user installs software from the Internet, the system records the target URL along with other URLs opened during installation. It is likely that malware is not located on the same website where a user begins installation of an application, so for successful analysis the system gathers more information about the malware network configuration. The system may also track and log a history of applications executed on the client computer. This history can include relationships between applications, such as executable files that launched other executable files. If the system later identifies an executable file as malware, the system can determine if applications responsible for launching the executable file are also malware or mark them as potentially malicious for a technician to investigate further.

In some embodiments, the malware analysis system automatically submits threat information from the threat log to a back-end service or other analysis authority (e.g., a server component of an anti-malware application). For example, if the system receives evidence that there is an infected file on the client computer, the system may automatically submit threat log information. The infected file may be detected by an anti-malware application, operating system alert, third party detection alert, user on-demand action (e.g., flagging a file as malicious), and so on. As another example, a minifilter driver of the system may detect a FILE_OPEN request for a file object that is generally hidden from user-mode applications.

Following is an example scenario. A user suspects that malware has infected his client computer because the computer is running too slow. The user runs an anti-malware application, but the application reports no malware. The user requests that the malware analysis system investigate further. The user's action may cause the malware analysis system to select data that would be helpful for investigation from the threat log (e.g., recent installation data, kernel mode modification history, network frequency and utilization, and so on) and send the data to the back-end service for further analysis. If the back-end service identifies malware, the service may provide updated remediation information to the client computer and automatically remove the malware.

Figure 3:
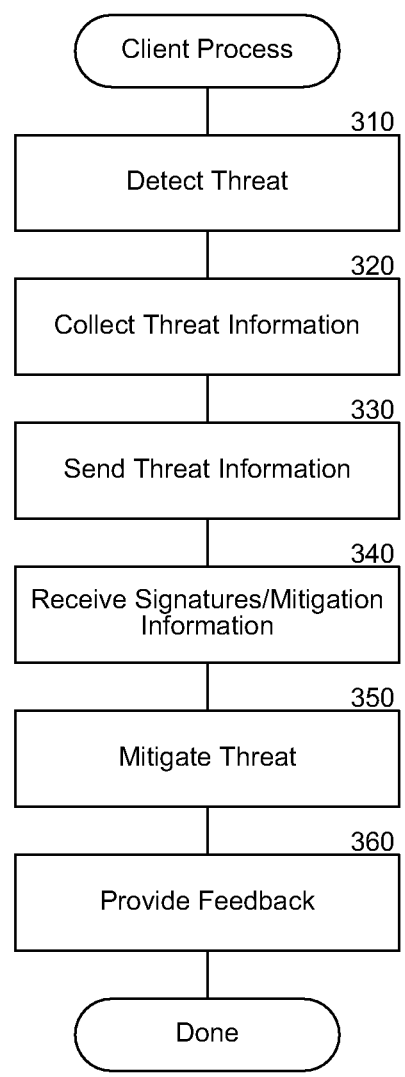
FIG. 3 is a flow diagram that illustrates the processing by the malware analysis system on the client computer, in one embodiment.

FIG. 3 is a flow diagram that illustrates the processing by the malware analysis system on the client computer, in one embodiment. In block 310, the system detects a potential threat or malware application. For example, a user may attempt to visit a known malicious URL or an application may request access to a file that is unusual. In block 320, the system collects information about the potential threat. For example, the system may collect a description of each of the resources that the potential malware application accesses, including files, registry keys, and so on. As another example, the system may collect network traffic initiated by the potential malware application, such as URLs visited, ports opened, and so forth. In block 330, the system submits the threat information to a back-end service for further analysis.

In block 340, the system receives threat signatures and mitigation information from the back-end service that detect threats confirmed by the back-end service. For example, the signatures may identify particular files that contain malicious executable code. In block 350, for detected threats the system applies mitigation actions specified by the received mitigation information. For example, the mitigation information may specify a particular file to delete or registry key to modify to neutralize the threat from an identified malware application. In block 360, the system optionally provides information about the threats detected via the signatures on the client computer to the back-end service, so that the back-end can collect statistical information about the occurrence of particular threats to improve the threat mitigation process. After block 360, these steps conclude.

Back-End Analysis

The client computer submits samples to the back-end for analysis. For example, when an event occurs that indicates a potential threat or a user suspects a file of being malicious, the client computer submits the file and data describing the user's actions and system changes related to the sample (e.g., created files, registry keys, opened internet connection, URLs, and so on). The back-end receives the submitted samples and performs automated analysis on the samples. For example, the back-end may automatically configure a processing environment for reproducing the threat using information about the original processing environment stored in the received threat information. As the suspicious code executes, the malware analysis system records the threat's behavior (e.g., files, registry keys, other items the threat accesses or modifies) and verifies that the behavior recorded on the back-end matches with data reported from the client computer. The environment can download malware from URLs described in the threat information, imitate user action similar to how it is described in the threat information, and so on. The system can also monitor URLs in the threat information over time (e.g., the next 6-12 months) to track threats and potential variants.

When the system has verified the behavior, the system invokes a sample grouping process. The grouping process compares behavior of the threat the system is currently analyzing against the behavior of previously analyzed threats (e.g., stored in a data store) to identify related threats and the family to which the current threat might belong. For example, several variants of the same malware may modify the same files and registry keys of a client computer. After the system identifies the family, the signature builder creates generic detection signatures for the whole family or for variant-specific detection. Finally, the system release signatures to client computers, such as through a regular update process. A mitigation component on the client computer uses the signatures to remove the threat from the client computer, such as by deleting files, uninstalling applications, and so forth.

In some embodiments, the malware analysis system ranks threats received by priority. For example, the system may assign a high priority to threats that produce a high number of samples from many client computers. However, this is not always desirable, as low reporting is not necessarily correlated with a low threat level. Low reporting may simply mean that a threat that is widespread is avoiding detection in many instances. Such threats may be new threats to which the system should give increased priority. Therefore, as the system analyzes threats and deploys mitigation signatures and instructions, the system measures the performance of the cycle in a type of feedback loop. For example, if a previously rarely reported threat results in a high number of removals or mitigation actions after the system releases a new signature for the threat (e.g., in the first couple of days), then the system reevaluates the priority assigned to that family, so that future similar threats are given a higher priority.

The priority weighting promotes more timely inspection by technicians or automated analysis, thereby more effectively utilizing limited analysis resources. The malware analysis system provides an end-to-end loop between the client and server that continually refines the process of learning about and mitigating threats effectively. Thus, even though the backlog of threats waiting for analysis may continue to grow as malware authors create more malware, the system is still being more effective than prior systems at prioritizing which malware to analyze and iteratively tuning the detection and mitigation process.

As described herein, the malware detection system creates a feedback loop in which client computers feed threat information into a back-end service for a more context relevant analysis, and the back-end service in turn provides more timely and complete signatures updates so that the updated client utilizing these signatures can more accurately detect malware (minimizing partial detections and false negatives). Thus, when a false positive or misclassification occurs, the system can consume these "anomalies" and implement self-correction to prevent similar errors from happening in the future.

In some embodiments, the malware detection system also allows technicians to intervene in the process and request more information from a client computer. For example, if a technician cannot completely analyze a threat, the technician may still be able to provide an update signature for the threat and create a script that gathers additional information for further analysis when the system detects instances of the threat. The system gets the additional requested information from both the original client reporting the threat as well as other clients that encounter the same threat. Next time the threat is encountered, the client computer submits any requested files, registry keys, and other telemetry as requested by the technician in an effort to complete the whole picture about the threat. While anti-malware vendors have provided a service component including signature updates before, the iterative ability described herein that allows a technician or backend service to dig deeper into threats detected on client computers when the threat is next encountered provides a new level of threat analysis and mitigation that has been previously unavailable.

Figure 4:
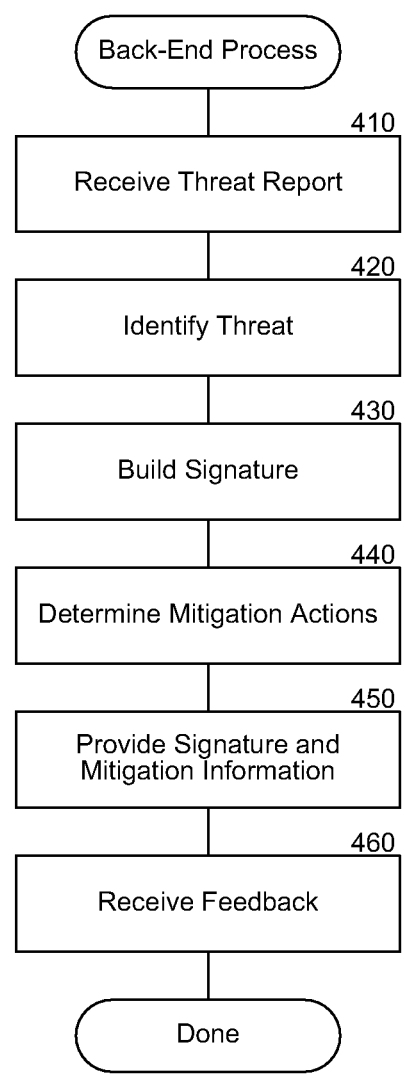
FIG. 4 is a flow diagram that illustrates the processing of a back-end service of the malware analysis system to analyze and mitigate potential threats, in one embodiment.

FIG. 4 is a flow diagram that illustrates the processing of a back-end service of the malware analysis system to analyze and mitigate potential threats, in one embodiment. In block 410, the system receives a threat report from a client computer. For example, the client computer may detect malware matching a signature previously provided by the back-end service or behavior that is suspicious. The report includes detailed information about the execution history of the threat. In block 420, the system attempts to identify the threat and group it based on previously analyzed threats. For example, the threat information may distinguish the threat and correlate it with previously detected threats that have similar behavior. The system may also configure an execution environment to reproduce the threat and execute the threat there to gather additional information for identifying the threat.

In block 430, the system builds a signature for detecting the threat. For example, the signature may detect threats in a family or a particular threat variant at an early point in the execution or installation of the threat on a client system. In block 440, the system determines how to mitigate the threat and produces a mitigation script or actions. For example, the system may determine that deleting a file installed by the threat will neutralized the threat. In block 450, the system provides the signature and mitigation script to client computers. For example, the client computers may periodically query the back-end service for new mitigation information. In block 460, the system receives feedback information from a client computer that indicates threats detected by the client computer based on signatures received from the back-end service. For example, the feedback information may contain an identifier that identifies a particular threat family or variant based on a signature that detected the threat on the client computer. The system uses the feedback information to prioritize threats and improve threat detection. After block 460, these steps conclude.

From the foregoing, it will be appreciated that specific embodiments of the malware analysis system have been described herein for purposes of illustration, but that various modifications may be made without deviating from the spirit and scope of the invention. For example, although malware applications have been described, the system can also be used to detect malicious documents, email, phishing scams, and so forth using similar techniques. Accordingly, the invention is not limited except as by the appended claims.

We claim:

1. A computer-implemented method for tracking malware execution on a client computer, the method comprising:

detecting at the client computer a potential malware application;

collecting at the client computer threat information about the potential malware application, wherein the threat information includes executable code of the potential malware application itself and environment information describing configuration settings of the client to allow recreating the client environment at an analysis server and executing the potential malware application for analysis in an environment that reproduces at a server the specific environment in which the potential malware application would execute on the client computer including the collected configuration settings of the client from which the executable code of the potential malware application was collected, and wherein the threat information also includes historical data from the client computer that indicates how the potential malware application initiated each action, such that the server, upon collecting potential malware applications from two different clients A and B will execute the malware two separate times in two separate environments: 1) the recreated environment of client A, and 2) the recreated environment of client B based on the specific configuration settings collected from A and B;

submitting from the client computer the threat information to a back-end service for further analysis;

receiving at the client computer a threat signature and mitigation information from the back-end service, wherein the signature includes data for detecting a threat confirmed by the back-end service; and applying on the client computer one or more mitigation actions to the detected potential malware application based on the signature received from the back-end service.

2. The method of claim 1 wherein detecting a potential malware application comprises detecting a request to connect to a known malicious URL.

3. The method of claim 1 wherein detecting a potential malware application comprises detecting an attempt to access an operating system file.

4. The method of claim 1 wherein collecting threat information comprises collecting information about at least one of a file, directory, registry key, and network port accessed by the potential malware application.

5. The method of claim 1 wherein the threat signature identifies a particular file associated with the malware application.

6. The method of claim 1 wherein the mitigation actions include deleting a file associated with the potential malware application from the client computer.

7. The method of claim 1 further comprising providing information to the back-end service about a threat detected based on the received signature, so that the back-end can collect statistical information about the occurrence of particular threats to improve the threat mitigation process.

8. A computer system for detecting and removing malicious applications, the system comprising:

a threat detection component configured to detect events on a client computer that indicate a potential malicious application;

an information collection component configured to collect at the client computer information about the potential malicious application, wherein the collected information includes executable code of the potential malicious application itself and environment information describing configuration settings of the client to allow recreating the client environment and executing the potential malicious application for analysis in an environment that reproduces at a server the specific environment in which the potential malicious application would execute on the client computer including the collected configuration settings of the client from which the executable code of the potential malicious application was collected, and wherein the collected information also includes historical data from the client computer that indicates how the potential malicious application initiated each action, such that the server, upon collecting potential malware applications from two different clients A and B will execute the malware two separate times in two separate environments: 1) the recreated environment of client A, and 2) the recreated environment of client B based on the specific configuration settings collected from A and B;

a communication component configured to communicate threat reports from the client computer to a back-end service and signatures for detecting malicious applications from the back-end service to the client computer;

a threat data store configured to store information about potential malicious applications reported by client computers, a queue of potential malicious applications waiting to be analyzed, signatures for detecting malicious applications, and mitigation instructions for removing malicious applications from client computers;

a threat analysis component configured to analyze received threat reports by recreating a specific client environment based on information collected from at least one client computer and executing the potential malicious application in a manner that the potential malicious application would execute on the client computer;

a signature builder component configured to receive information about analyzed threats from the threat analysis component and create a signature for detecting instances of the threat; and a mitigation component configured to apply signatures and mitigation instructions to identify known threats and carry out mitigation actions in response to identified threat instances.

9. The system of claim 8 wherein the threat detection component comprises a kernel-mode driver that collects information about the potential malicious applications' execution.

10. The system of claim 8 wherein the information collection component stores a browsing history of a user of the client computer.

11. The system of claim 8 wherein the threat analysis component is further configured to reproduce an execution environment for received threat reports, execute received potential malicious applications, and classify the potential malicious applications.

12. The system of claim 8 wherein the mitigation component is further configured to receive signature updates from the back-end service, scan the client computer for each signature received, and carry out mitigation actions for any detected threat.

13. The system of claim 8 wherein the mitigation component is further configured to gather additional information about the potential malicious application based on a request received from the back-end service.

14. The system of claim 8 further comprising a feedback component configured to provide threat detection information from the client computer to the back-end service and to prioritize threat report analysis on the back-end service.

15. The system of claim 8 further comprising a user interface component configured to provide an interface for a technician to guide threat analysis.

16. A computer-readable storage device encoded with instructions for controlling a computer system providing a back-end service to collect and analyze malware threats reported by client computers, by a method comprising:

receiving a threat report from a client computer that identifies a malware threat, wherein the threat report includes executable code associated with the malware threat and environment information describing configuration settings of the client to allow recreating the client environment and executing the executable code for analysis in an environment that reproduces at a server the specific environment in which the executable code would execute on the client computer including the collected configuration settings of the client from which the executable code of the malware threat was collected, and wherein the threat report also includes historical data from the client computer that indicates how the malware threat initiated each action, such that the server, upon collecting potential malware applications from two different clients A and B will execute the malware two separate times in two separate environments: 1) the recreated environment of client A, and 2) the recreated environment of client B based on the specific configuration settings collected from A and B; classifying the malware threat based on previously analyzed threats;

building a signature for detecting the malware threat;

determining mitigation actions for neutralizing the malware threat and producing a mitigation script based on the mitigation actions; and providing the signature and mitigation script to the client computer.

17. The device of claim 16 wherein the received threat report includes historical execution information related to the malware threat.

18. The device of claim 16 further comprising configuring an execution environment to reproduce the malware threat and executing the malware threat to gather additional information about the malware threat.

19. The device of claim 16 wherein classifying the malware threat comprises identifying a family of malware that contains malware with matching characteristics to the malware threat.

20. The device of claim 16 wherein providing the signature and mitigation script to the client computer comprises responding to a periodic request of the client computer for updated signature information.

* * * * *